Feb. 27, 1962 W. TIRASPOLSKY 3,022,837
MOTORS FOR SUBTERRANEAN WORK
Filed Oct. 14, 1957
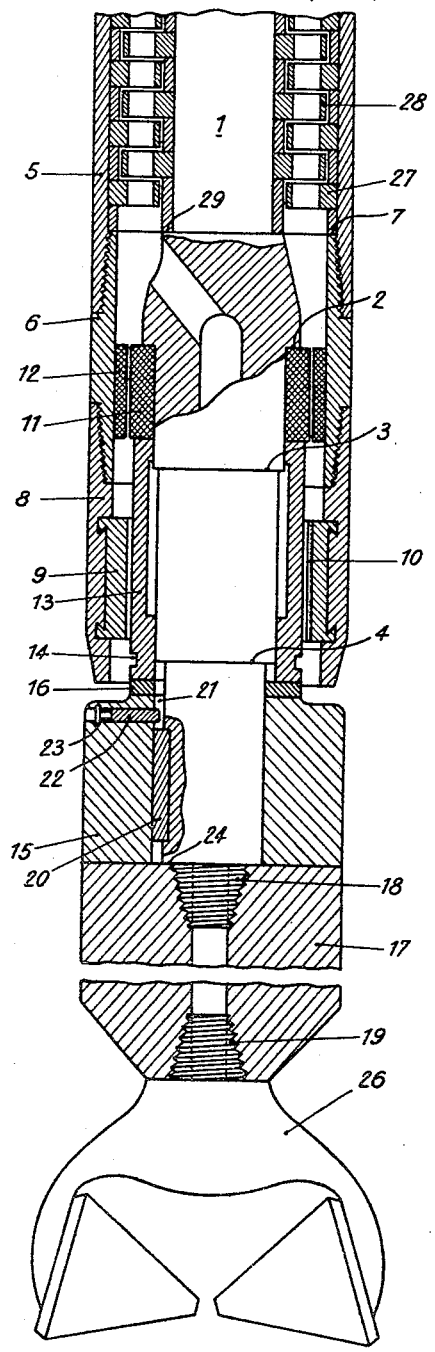

United States Patent Office 3,022,837
Patented Feb. 27, 1962

3,022,837
MOTORS FOR SUBTERRANEAN WORK
Wladimir Tiraspolsky, 69 Ave. Victor Cresson,
Issy-les-Moulineaux, France
Filed Oct. 14, 1957, Ser. No. 690,134
Claims priority, application France Oct. 12, 1956
7 Claims. (Cl. 175—107)

The present invention has general reference to motors for subterranean work and relates more particularly to turbines for drilling wells, such as wells for the exploitation of oil fields.

It is known that the lower bearing of drilling turbines is generally subjected to heavy wear since it undergoes the most severe side strains as the drilling proceeds. Heretofore the inspection, the overhaul, the repair or the substitution of a new bearing for an old worn bearing involved in most cases a complete dismantling of the turbine. This was a lengthy and expensive operation due regard being paid to the difficulty of the job and the relatively large number of parts to be taken away.

A few technical solutions of the problem have failed to give adequate guaranty against accidental unscrewing while considerably lessening the mechanical strength of the turbine shaft particularly responsive to flexion stresses.

An object of the invention is to obviate the aforesaid disadvantages by the provision of a new or improved lower bearing for a motor for subterranean work, particularly for a drilling turbine, the construction of such lower bearing being such as to enable the latter to be dismantled for being inspected, overhauled, repaired or replaced without necessitating the disassembly of the other elements of the turbine and without altering the mechanical characteristics of the motor or turbine shaft, also without impairing the safety of the assembly.

Another object of the invention is to provide an improved motor for subterranean work or drilling turbine having a lower bearing possessing the aforesaid characteristics and advantages, said motor or turbine being generally of more rugged nature than similar appliances as devised hitherto.

Viewed in one aspect, the invention is embodied in a lower bearing unit for a motor for subterranean work and more particularly for a drilling turbine, said bearing unit being characterized by the fact that the lower sleeve structure adapted to accommodate said bearing is made up of a pair of sleeve elements removably interconnected (for example by being screwed together) the upper element which is stationary forming an abutment for the stack of stator parts of the turbine, while the lower sleeve element forms a bearing sleeve which cooperates with a wear-taking lining carried by the motor or turbine shaft, holding means being provided for removably retaining said lining on said shaft and for ensuring adequate prestressed conditions so as to compensate for the reduction of mechanical resistance of said shaft or for improving said resistance.

When it is desired to dismantle the lower bearing of the subterranean motor or drilling turbine, it is only sufficient to take away the aforesaid holding means, then to dismantle the bearing sleeve (for example by unscrewing the same) and, if required, to remove the lining from the motor or turbine shaft. By comparison with existing constructions, the diameter of the projecting portion of the shaft is so reduced as to adapt itself to the inner diameter of the wear-taking lining of the lower bearing. Moreover, in the case of a drilling turbine, the abutment shoulder for the stack of rotor parts is provided above said lining. This reduction of diameter of the shaft is compensated for by arranging therearound a stack of ring members or equivalent parts subjected to adequate compression.

Viewed in another aspect, the invention is embodied, according to a preferred constructional form, in a structure including on the lower end portion of the motor or turbine shaft a compensating sleeve as described in a copending application, said compensating sleeve being preferably adapted to also partake of the prestressing of the assembly built by the same with the shaft, the wear-taking lining and the other cylindrical parts which surround the shaft, whereby the assembly possesses particularly valuable mechanical characteristics in spite of the reduced diameter of the lower end of the shaft.

A further object of the invention is to provide a lower bearing structure for a motor for subterranean work or a drilling turbine as aforesaid including additional devices such for example as a unidirectional locking device which may be incorporated with the remainder of the assembly and which may be mounted directly above the wear-taking lining, the arrangement being such that a portion of this device partakes of the prestressing of the assembly thus built.

With these and such other objects in view as will incidentally appear hereafter, the invention comprises the novel construction and combination of parts that will be now described with reference to the accompanying diagrammatic drawing exemplifying the same and forming a part of the present disclosure.

The drawing is a one FIGURE illustration in sectional elevation of the lower end of a drilling turbine whose lower bearing structure is removable and is constructed according to the invention.

As illustrated, the reference 1 designates the turbine shaft which is provided with an abutment shoulder 2 and shoulders 3, 4 adapted to facilitate dismantling. The shaft 1 is provided with an upper shoulder 29 on which rests the stack of rotor parts 28 of the turbine. The body 5 of the turbine has screwed thereon a primary abutment sleeve 6 for the stack of stator parts 27 of the turbine. Said sleeve 6 is provided at its upper end with a right-handed threaded portion and at its lower end with a left-handed threaded portion. The stack of stator parts of the turbine rests upon a shoulder 7 formed by the top face of the primary sleeve 6. The latter is fitted at its lower end with a secondary sleeve 8 in which is housed a bearing unit 9 (for example of the rubber lined type) having irrigation grooves or flutes 10.

The shaft 1 supports a torque transmitting device diagrammatically illustrated as a rotor member 11 affixed to shaft 1 and a stator member 12 attached to sleeve 6. This torque transmitting device may selectively lock the shaft to the sleeve 6 and may be of any conventional well known type, the details of which are not important to an understanding of the invention, and are not a part of the invention as claimed. Their member 11 abuts shaft shoulder 2 and is engaged at its lower end by the wear-taking lining 13 of the lower bearing of the turbine which cooperates with the bearing unit 9 and is formed adjacent its lower end with a circular groove 14 permitting adequate grip of a lining extractor or puller.

The lower end of the wear-taking lining 13 rests upon a compensating collar or sleeve 15. An intermediate ring member 16 is interposed, and the collar or sleeve 15 is held in position by the lower joint 17 which has a threaded portion 18 screwed upon the lower end of the shaft and a tool-receiving threaded portion 19 for a tool 26. The collar or sleeve 15 is angularly held on the shaft 1 by a key or feather 20 received in a groove or keyway 21. It is prevented from falling out, when the lower joint 17 is unscrewed, by a stop pin 22 having a central extraction threaded portion and held in position by an elastic ring-shaped clip 23.

The method of mounting the lower bearing of the turbine is as follows:

Assuming the abutment sleeve 6 and the bearing sleeve 8 to be in position, the member 11 is slipped over the shaft 1 and the wear-taking lining 13 is set into place over the shaft 1, these two elements form a tubular assembly whose upper end comes into abutting relation with the shoulder 2. The collar or sleeve 15 is then positioned and the gap or clearance between the flush surface of the shoulder 24 on the shaft 1 and the lower end surface of said collar is measured. The collar 15 is then removed and a ring member 16 is mounted on the shaft 1 against the wear-taking lining 13. The thickness of said ring member 16 is slightly larger than said gap or clearance. The collar 15 is then re-positioned by means of the key 20 and stop pin 22, and then the lower joint 17 is screwed upon the end of the shaft 1. The superfluous clearance of the collar 15 downwardly beyond the shoulder 24 due to proper selection of the ring member 16 is then compensated for by compressing the assembly made up of the collar 15, ring member 16 and lining 13 and member 11, while the end portion of the shaft is set under tension. The prestressing conditions thus created increase the mechanical strength and build a unitary or one-piece block assembly.

When it is desired to dismantle the lower bearing structure of the turbine, for example for inspecting, overhauling or repairing the same, the joint 17 and the collar 15 must be removed, whereafter the possibility is afforded to unscrew the bearing sleeve 8 and to pull away the wear-taking lining 13.

This only necessitates a minimum of work and time. This operation can be carried out in situ while normally dismantling of the turbine would only be possible in a specially equipped workshop.

It will be seen from the foregoing that the objects of the invention are attained thanks to the improved lower bearing structure and that the invention represents a substantial improvement over the prior art.

Minor constructional details may be varied without departing from the scope of the subjoined claims.

What is claimed is:

1. In a motor for subterranean work such as a drilling turbine as those used for the exploitation of oil fields, including a body, a shaft mounted axially in said body, a stack of rotor parts carried by said shaft, a stack of stator parts housed in said body, and a tool fixed to the lower end of said shaft; a primary sleeve fixed to said body, a shoulder provided at the upper end of said primary sleeve, said stator parts resting upon said shoulder, a secondary sleeve removably secured on said primary sleeve, a radial bearing in said secondary sleeve, a wear-taking lining removably mounted on the lower end of the shaft within said secondary sleeve, and removable holding means secured on the lower end of said shaft maintaining said lining upon said shaft.

2. In a motor for subterranean work such as a drilling turbine as those used for the exploitation of oil fields including a body, a shaft mounted axially in said body, a stack of rotor parts carried by said shaft, a stack of stator parts housed in said body, and a tool fixed to the lower end of said shaft; a primary sleeve secured to said body, a shoulder provided at the upper end of said primary sleeve, said stator parts resting upon said shoulder, a conical screw thread provided at the lower end of said primary sleeve, a secondary sleeve having a conical upper screw thread, said secondary sleeve being removably screwed on said conical screw thread of said primary sleeve, a radial bearing in said secondary sleeve, a wear-taking lining removably mounted on the lower end of said shaft within said secondary sleeve, and removable holding means secured on the lower end of said shaft maintaining said lining upon said shaft.

3. A motor for subterranean work according to claim 2, including means defined on said shaft forming a downwardly directed shoulder operatively associated with said lining whereby axial force applied to said lining by said holding means is resisted by said shoulder.

4. In a motor for subterranean work such as a drilling turbine as those used for the exploitation of oil fields including a body, a shaft mounted axially in said body, a stack of rotor parts carried by said shaft, a stack of stator parts housed in said body, and a removable tool-receiving joint threadedly affixed to the lower end of said shaft; a primary sleeve secured to said body, a shoulder provided at the upper end of said primary sleeve, said stator parts resting upon said shoulder, a secondary sleeve removably secured on the lower end of said primary sleeve, a radial bearing in said secondary sleeve, a portion of reduced diameter provided on said shaft, a wear-taking lining removably mounted over said reduced portion of the shaft within said secondary sleeve, and a collar mounted upon the end portion of the shaft supporting said wear-taking lining, said collar and said wear-taking lining being maintained upon said shaft by said tool-receiving joint.

5. A motor for subterranean work according to claim 4, including means defined on said shafts forming a downwardly directed shoulder, said wear-taking lining having an end abutting against said shoulder, and an abutment shoulder provided at the lower end of said shaft between the downwardly directed shoulder and a lower screw-thread for the joint, a ring interposed between said lining and collar, the distance between said lower abutment shoulder and said downwardly directed shoulder being, in unstressed condition, shorter than the total length of said wear-taking lining, ring and said collar.

6. In a motor for subterranean work such as a drilling turbine as those used for the exploitation of oil fields including a body, a shaft mounted axially in said body, a stack of rotor parts carried by said shaft, a stack of stator parts housed in said body, and a removable tool-carrying joint attached to the lower end of said shaft; a primary sleeve secured to said body, a shoulder provided at the upper end of said primary sleeve, said stator parts resting upon said shoulder, a conical screw-thread provided at the lower end of said primary sleeve, a secondary sleeve having a conical upper screw-thread, removably screwed on the lower screw-thread of said primary sleeve, a radial bearing in said secondary sleeve, means defined on said shaft forming a downwardly directed shoulder, a wear-taking lining mounted over said shaft in operative abutment relationship with said shoulder and located at the same level as said bearing provided in said secondary sleeve, said lining extending substantially to the lower end of said secondary sleeve, a collar having a diameter substantially equal to the outer diameter of said secondary sleeve and mounted upon the lower portion of said shaft, a ring interposed between said lining and collar, and a joint-receiving screw-thread provided at the lower end of said shaft, said joint removably holding said collar and lining on said lower portion of the shaft.

7. A motor for subterranean work according to claim 6, comprising an abutment shoulder provided at the lower end of the shaft, between said shaft and said joint-receiving screw-thread, the distance between said downwardly directed shoulder of the shaft and said abutment shoulder being, in unstressed condition, shorter than the total length of said ring, lining and collar.

References Cited in the file of this patent

UNITED STATES PATENTS

| | | |
|---|---|---|
| 1,727,276 | Diehl | Sept. 3, 1929 |
| 2,554,005 | Bodine | May 22, 1951 |
| 2,588,311 | Wagner | Mar. 4, 1952 |
| 2,908,534 | Rietsch | Oct. 13, 1959 |

FOREIGN PATENTS

| | | |
|---|---|---|
| 673,185 | Great Britain | June 4, 1952 |
| 206,296 | Germany | of 1909 |